United States Patent Office 3,714,262
Patented Jan. 30, 1973

3,714,262
BICYCLIC POLYKETONE INTERMEDIATES
Gabriel Saucy, Essex Fells, N.J., assignor to Hoffmann-La Roche Inc., Nutley, N.J.
No Drawing. Filed Jan. 19, 1970, Ser. No. 4,136
Int. Cl. C07c 45/00
U.S. Cl. 260—586 H        6 Claims

ABSTRACT OF THE DISCLOSURE

Bicyclic polyketones are obtained by oxidation of correspondingly substituted cyclopenta(f)(1) benzopyrans. In a preferred embodiment 3-(4-oxopentyl)-6aβ-methylperhydrocyclopenta(f)(1) benzopyran-4a,7-diol is oxidized with Jones reagent to yield 4-(3,7-dioxo-octyl)-7a-methylperhydroindan-1,5-dione. The bicyclic polyketones are useful as intermediates in the total synthesis of steroids of known medicinal value.

BRIEF DESCRIPTION OF THE INVENTION

The present invention relates to novel polyketonic bicyclic compounds and processes for their preparation. In particular, the present invention relates to polyketonic bicyclic compounds of the following formula:

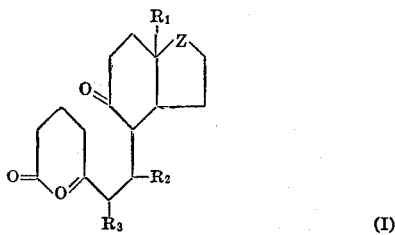

(I)

where Z is a member selected from the group consisting of carbonyl and a group of the formula

where $R_4$ taken alone is hydroxy, lower alkoxy and lower alkanoyloxy, $R_5$ taken alone is hydrogen and lower aliphatic hydrocarbyl and $R_4$ and $R_5$ taken together are lower alkylenedioxy; $R_1$ is lower alkyl; and $R_2$ and $R_3$ are hydrogen or lower alkyl.

In preferred embodiments compounds of Formula I are defined wherein Z is carbonyl, $R_1$ is methyl or ethyl, $R_2$ and $R_3$ are both hydrogen. Particularly preferred compounds of Formula I are obtained when the absolute configuration of $R_1$ at 7a is beta and the hydrogen at 3a is alpha.

As used herein, the term "lower alkyl" is meant to include straight or branched chain hydrocarbon radicals having from 1 to 7, most preferably from 1 to 4, carbon atoms such as methyl, ethyl, propyl, etc. Examples of suitable lower alkoxy groups include, for example, methoxy, ethoxy, propoxy and the like. The term "lower alkanoyloxy" denotes lower alkylcarboxy groups and includes groups such as acetyloxy, propionyloxy, butanoyloxy and the like. As used herein the term "lower aliphatic hydrocarbyl" is meant to denote a monovalent substituent having from 1 to 7 carbon atoms consisting solely of carbon and hydrogen and which contains no aromatic unsaturation but which can be otherwise saturated or unsaturated, i.e., an alkyl or alkylene group. The term "lower acyl" denotes a group consisting of the residue of a hydrocarbyl monocarboxylic acid formed by removal of the hydroxyl portion of the carboxyl group and which contains up to 8 carbons.

The process aspect of the present invention involves formation of compounds of Formula I above by oxidation of perhydrocyclopenta(f)(1) benzopyrans of the following formula:

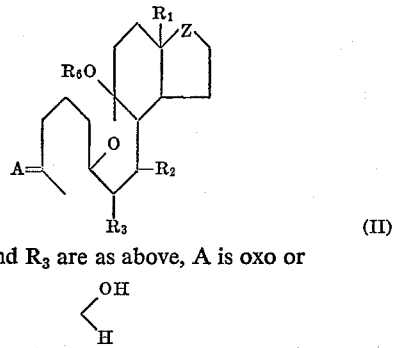

(II)

where Z, $R_1$, $R_2$ and $R_3$ are as above, A is oxo or

and $R_6$ is hydrogen, lower alkyl and lower acyl, most preferably hydrogen.

The oxidation of compounds of Formula II above may be conveniently conducted utilizing known chemical oxidizing agents for this purpose in the presence of acid, preferably a mineral acid or a lower alkanoic acid. Suitable oxidizing agents include Jones reagent (chromic acid, sulfuric acid and acetone), chromic acid, potassium dichromate, or potassium permanganate, or a chromic acid-acetic acid mixture. Preferred acids include sulfuric acid and acetic acid. An inert organic solvent may also be present in the reaction mixture. Particularly desirable organic solvents for this purpose include ketones such as acetone; ethers such as ethyl ether; aromatic hydrocarbons, e.g., benzene, toluene or xylene; chlorinated hydrocarbons such as 1,2-dichloroethane, methylenechloride, chlorobenzene and the like.

The oxidation reaction may be conducted at a temperature in the range of from about −10 to +50° C., most preferably at a temperature in the range of from about 0 to 30° C.

It is necessary that when compounds of Formula I where Z comprehends a hydroxy methylene moiety are prepared, that the starting material of Formula II above be selected having a corresponding substituted oxy methylene group. This is due to the fact that an unprotected hydroxy group will be converted to a carbonyl under the conditions used in the above oxidation step. The hydroxy group may then be obtained from its protected form subsequent to the oxidation step by hydrolysis procedures well known in the art. Similarly, compounds of Formula II wherein Z is hydroxymethylene may be utilized as starting material for corresponding compounds of Formula I where Z is carbonyl since the indicated hydroxy group will be oxidized under the conditions of the oxidation step.

The preparation of compounds of Formula II is described in detail in co-pending application Ser. No. 633,-730 filed Apr. 26, 1967 now abandoned; which disclosure is contained in its co-pending continuation-in-part application Serial No. 679,989 filed Nov. 2, 1967, now Pat. No. 3,544,598; inventor Gabriel Saucy.

It is within the scope of the present invention to utilize both racemic and optically active compounds in the practice of the processes enumerated above. Compounds of Formula I produced by the process of the present invention are novel compounds and are useful as intermediates in the preparation of steroidal compounds of known pharmacological utility. For example, compounds of Formula I may be cyclized using an acid or an acid-base complex system.

The acids useful in the cyclization step can comprise either strong inorganic or organic acids. Examples of suitable inorganic acids include the mineral acids, most preferably sulfuric acids, hydrochloric acid and hydrobromic acid.

Organic acids which can be employed in this cyclization step include the sulfonic acids such as the arylsulfonic acids, e.g., p-toluenesulfonic acid or the lower alkenylsulfonic acids, e.g., methylsulfonic acid.

The cyclization may also be conducted in the presence of an acid-base complex system. The acid component of such a complex can comprise an inorganic or organic acid. Examples of suitable inorganic acids include perchloric acid and the mineral acids enumerated before. Among the organic acids, one can include, for example, the carboxylic acids (both mono and polycarboxylic acids) and the organic sulfonic acids. Preferred organic acids include monocarboxylic acids such as lower alkanoic carboxylic acids having from 2 to 10 carbon atoms, e.g., acetic acid, propionic acid, decanoic acid and the like, or aromatic carboxylic acids such as benzoic acids. The aforesaid organic acids may also contain other substituent groups such as halogen or nitro. Thus, the halogenated lower alkanoic acids represent the preferred embodiment of this cyclization process and include, as specific examples, α-chloracetic acid and trifluroacetic acid. The nitrobenzoic acids are an example of nitro substituted organic acids.

The base component of the acid-base complex system is preferably an organic nitrogen-containing compound, most desirably a cyclic nitrogen-containing organic compound. The cyclic base compound may have 5 or 6 atoms in its ring structure and can contain an additional hetero atom such as oxygen. Suitable cyclic bases useful in the cyclization step include pyrrolidine, piperidine, pyridine, pyrrol and morpholine.

Examples of suitable acid-base complex systems include pyrrolidine acetate, piperidine acetate, piperidine α-chloracetic acid, morpholine acetate, piperidine perchlorate, piperidine p-toluenesulfonic acid, among others. Most preferably piperidine acetate is employed as the acid-base complex system.

The cyclization step may be conveniently conducted at a temperature in the range of from about 0° to 135° C., most preferably in the range of from about 80° to 125° C. The procedure may be conducted in the presence of an inert organic solvent. Suitable solvents for this purpose include aromatic hydrocarbons such as benzene, xylene or toluene; ketones such as acetone; and lower alkanols such as benzene, xylene or or toluene; ketones such as acetone; and lower alkanols such as methanol, ethanol, i-propanol and the like.

The cyclization is most desirably conducted in the absence of atmospheric oxygen utilizing an inert gas such as nitrogen, argon, helium and the like, during the course of the reaction. The products of the cyclization step are known steroids of the following formula:

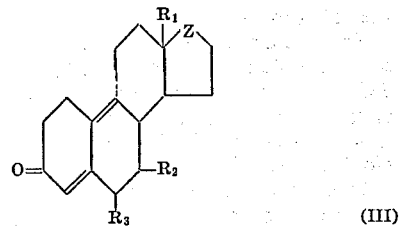

(III)

where $R_1$, $R_2$, $R_3$ and Z are as above.

The process and compounds of the present invention may be illustrated by reference to the following examples.

Example 1

A total of 49 g. of (±)-3-(4-oxopentyl)-6aβ-methylperhydrocyclopenta(f)(1)benzopyran-4a,7-diol was dissolved in 690 ml. of acetone and treated at 5–10° C. with a solution containing 46 g. of chromium trioxide disolved in 231 ml. of 6 N sulfuric acid. After stirring at room temperature for 2 hours, aqueous sodium bisulfite solution (1500 ml.; 1%) was added and the organic products were isolated with benzene. The benzene extract was washed well with saturated aqueous sodium bicarbonate solution and brine and then concentrated in vacuo. The 34 g. of crude (±)-4-(3,7-dioxo-octyl)-7a-methylperhydroindan-1,5-dione obtained was chromatographed on silica gel (0.2–0.5 mm. mesh; 1.5 kg.) and upon elution with 10% ethanol-ether yielded 23 g. of pure product. This material solidified to a waxy mass on standing. The product exhibited strong carbonyl bands at 1740 cm.$^{-1}$ and 1717 cm.$^{-1}$ in the infrared. The U.V. spectrum showed weak absorption at about 280 mμ (saturated carbonyl).

Calcd. for $C_{18}H_{26}O_4$ (percent): C, 70.56; H, 8.55. Found (percent): C, 69.90; H, 8.51.

The NMR spectrum (60 mHz.) exhibited typical signals at δ1.17 p.p.m. (singlet, 18-$CH_3$) and δ2.12 p.p.m. (singlet, —$COCH_3$).

Example 2

A solution of 5 g. of (±)-4-(3,7-dioyo-octyl)-7a-methyl-perhydroindan-1,5-dione in 100 ml. of toluene was heated at reflux under nitrogen with 1 g. of piperidine acetate for 18 hours. The reaction mixture was then treated with dichloromethane, extracted with aqueous sulfuric acid (2 N) and dried over magnesium sulfate. Removal of the solvents in vacuo gave 5.1 g. of an oil which was chromatographed on 450 g. of 0.2–0.5 mm. mesh silica gel. Elution with 25% and 50% ethyl acetate-benzene mixtures yielded 2.2 g. of (±)-19-nor-androsta-4.9(10)-dien-3,17-dione. Crystallization from ether gave the aforesaid product melting at 106–108° C. Recrystallization from hexane/ethyl acetate raised the melting point from 107–109° C.

Calcd. for $C_{18}H_{22}O_2$ (percent): C, 79.96; H, 8.20. Found (percent): C, 79.96; H, 8.19.

Example 3

A mixture containing 3α-(4-hydroxypentyl)-6aβ-methylperhydrocyclopenta(f)(1)benzopyran-4a,7β-diol, prepared by stirring 10 g. of crude 3α-(4-hydroxypentyl)-6aβ-methyl-1,2,3,5,6,6a,7,8,9,9a-decahydro-cyclopenta-(f)(1)benzopyran-7β-ol in 200 ml. of acetone and 25 ml. of 1 N sulfuric acid for two hours at room temperature, was cooled to 0° C. and treated with 37.5 ml. of Jones reagent over 15 minutes after stirring at room temperature for two hours 300 ml. of 1% aqueous sodium bisulfite solution was added and the solution extracted with benzene. The benzene extracts were washed well with saturated bicarbonate solution, brine and then were concentrated in vacuo. There was obtained 8.4 g. of crude C/D-trans-4-(3,7-dioxo-octyl)17aβ-methylperhydroindan-1,5-dione. This product was purified by chromatography on 420 g. of silica gel and elution with ether-benzene and ether alone. The IR spectrum of this product exhibited strong carbonyl absorption at 1742 cm.$^{-1}$ and 1715 cm.$^{-1}$.

Example 4

A solution containing 1.0 g. of 4-(3,7-dioxo-octyl)-7aβ-methyl-perhydroindan-1,5-dione in 25 ml. of toluene was heated at reflux under nitrogen with 0.20 g. of piperidine acetate for 16 hours. The toluene was removed in vacuo and the residue was taken up in dichloromethane, extracted with 1 N sulfuric acid, brine and then dried over sodium sulfate. Removal of the solvents in vacuo gave 890 mg. of an oil which was chromatographed on 89 g. of silica gel. Elution with 20% and 35% ethyl acetate in benzene yielded 324 mg. of nearly pure product (−)-19-nor-androsta-4,9(10)-dien-3,17-dione. Crystallization from ether gave 225 mg. of product, M.P. 138–140° C., [α]$_D^{25}$=−172.4° (c.=1.0 MeOH). Recrystallization from ethyl acetate-hexane gave pure product, M.P. 142.5–143.5° C., $[\alpha]_D^{25} = -191.44°$ (c.=0.4858 MeOH), $\lambda_{max}$=301 m$\mu$ ($\epsilon$=20,600 EtOH).

I claim:

1. A process for the preparation of compounds of the formula

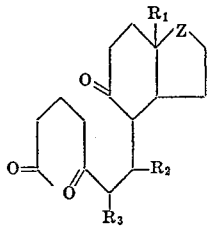

where Z is selected from the group consisting of carbonyl and a group of the formula

where $R_4$ taken alone is hydroxy, lower alkoxy or lower alkanoyloxy, $R_5$ taken alone is hydrogen or lower aliphatic hydrocarbyl having 1 to 7 carbon atoms consisting solely of carbon and hydrogen and containing no aromatic unsaturation and $R_4$ and $R_5$ taken together are lower alkylenedioxy; $R_1$ is lower alkyl and $R_2$ and $R_3$ are hydrogen or lower alkyl which process comprises oxidizing with an agent selected from the group consisting of Jones reagent, chromic acid, potassium chromate, potassium permanganate and chromic acid-acetic acid mixtures in the presence of an acid selected from the group consisting of mineral acids and lower alkanoic acids a compound of the formula

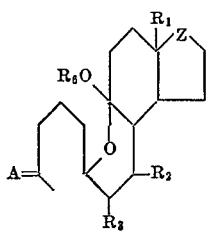

where Z, $R_1$, $R_2$ and $R_3$ are as above, A is oxo or

and $R_6$ is hydrogen, lower alkyl or the acyl radical of a $C_1$–$C_8$ hydrocarbyl mono carboxylic acid.

2. The process of claim 1 wherein Jones reagent is utilized as oxidation agent.

3. The process of claim 1 wherein A is oxo, Z is hydroxymethylene, $R_1$ is methyl and $R_2$ and $R_3$ both are hydrogen.

4. A compound of the formula

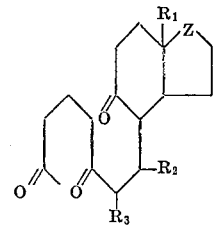

where Z is a member selected from the group consisting of carbonyl and a group of the formula

where $R_4$ taken alone is hydroxy, lower alkoxy and lower alkanoyloxy, $R_5$ taken alone is hydrogen and lower aliphatic hydrocarbyl having 1 to 7 carbon atoms consisting solely of carbon and hydrogen and containing no aromatic unsaturation and $R_4$ and $R_5$ taken together are lower alkylenedioxy; $R_1$ is lower alkyl and $R_2$ and $R_3$ are hydrogen or lower alkyl.

5. The compound of claim 4 which is racemic 4-(3,7-dioxo-octyl)-7a-methylperhydroindan-1,5-dione.

6. The compound of claim 4 which is C/D trans 4-(3,7-dioxo-octyl)-7a$\beta$-methylperhydroindan-1,5-dione.

References Cited

UNITED STATES PATENTS

| | | | |
|---|---|---|---|
| 2,839,567 | 6/1958 | Barkley | 260—586 H X |
| 3,454,600 | 7/1969 | Taub | 260—586 H X |

BERNARD HELFIN, Primary Examiner

G. A. SCHWARTZ, Assistant Examiner

U.S. Cl. X.R.

260—338, 340.7, 340.9, 345.2, 397.3, 488 B